No. 638,949. Patented Dec. 12, 1899.
G. ACKERMANN.
FILTER PRESS.
(Application filed Aug. 17, 1898.)
(No Model.)
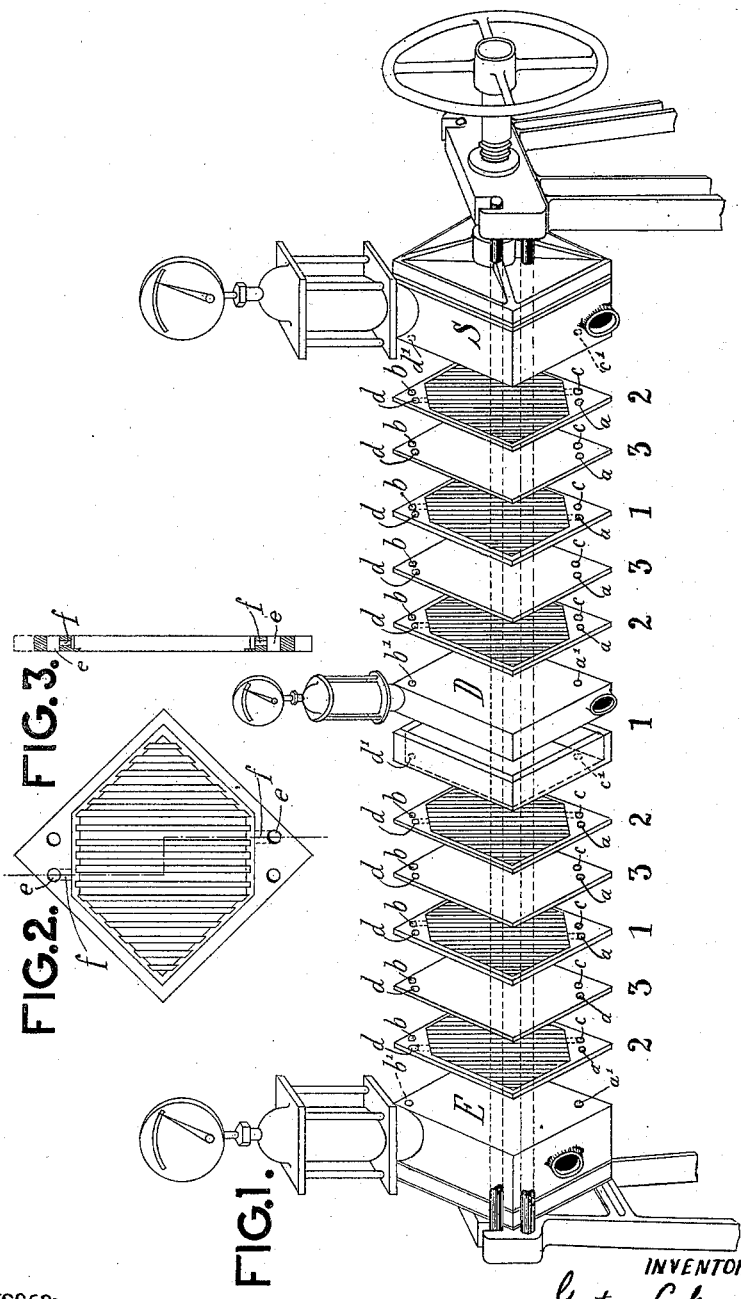
WITNESSES:
INVENTOR
ATTORNEYS

UNITED STATES PATENT OFFICE.

GUSTAV ACKERMANN, OF CHARLOTTENBURG, GERMANY, ASSIGNOR TO FILTER AND BRAUTECHNISCHE MASCHINEN-FABRIK ACTIEN-GESELLSCHAFT, VORMALS L. A. ENZINGER, OF WORMS, GERMANY.

FILTER-PRESS.

SPECIFICATION forming part of Letters Patent No. 638,949, dated December 12, 1899.

Application filed August 17, 1898. Serial No. 688,779. (No model.)

*To all whom it may concern:*

Be it known that I, GUSTAV ACKERMANN, brewmaster, of Charlottenburg, near Berlin, Germany, have invented certain new and useful Improvements in Filter-Presses with Intermediate or Collecting Chambers, of which the following is a full, clear, and exact specification.

The present invention relates to an improvement in filter-presses of the kind described in the German Patent Specification No. 42,894. In the press there described, however, the liquor or fluid to be filtered only passes through a single wall of filtering material before entering the chamber from which the clarified liquor is drawn. In order to obtain a clearer filtrate which keeps better from thick turbid fluids, the filter-press according to the present invention is provided with an intermediate chamber, being thus divided into a preliminary and a secondary filter. On the accompanying drawings such a filter-press with double or collecting chamber is illustrated.

In the drawings, Figure 1 is a perspective view of the filter-press with the parts thereof separated. Fig. 2 is a front view of one of the gridiron-frames, and Fig. 3 is a sectional view of the same.

The fluid to be filtered leaves the inlet-chamber E by the aperture $a'$ at the bottom and aperture $b'$ at the top, running thence into the channels or passages $a\ b$, which are formed, when all the single frames and plates are brought close together, with their apertures in line. The filtration is effected by means of gridiron-frames 1 and 2, between each pair of which a filter-plate 3 is arranged. Each such pair of frames and plate has, in addition to the apertures $a\ b$, other similar apertures $c\ d$, which likewise form channels when the separate frames and plates are brought together. In the gridiron-frame 1 the passages $a\ b$ are connected with the interior of the frame and, at the frame 2 the passages $c\ d$ are similarly connected, while at the filter-plates the passages merely form the connection between the passages in the frames. The openings $a\ b$ do not connect with the interior of the frames 2 and the passages $c\ d$ do not connect with the interior of the frames 1. The action, broadly stated, is that the liquid flows into one set of frames 1 through the openings $a\ b$, thence through the filter-plates, and out through the frames 2 by way of the passages $c\ d$. The passages $a\ b$ in the frames 1 and the passages $c\ d$ in the frames 2 are connected with the interior of said frames by the passages $f$. The filter frames or plates are preferably of the kind described in the German Patent Specification No. 69,043, according to which a filter-layer composed of compressed pulpy fibrous material is inclosed in a frame.

The liquid to be filtered flows through the passages $a\ b$ into the gridiron-frame 1, (or frames when for the sake of greater efficiency a number of pairs of gridiron-frames and filter-plates are used.) From the frame 1 the liquid then passes to the left and right through the filter-plates into the gridiron-frame 2, leaving the latter filtered, and through the passages $c\ d$. These passages $c\ d$ are in connection with the double chamber D. The filtered but still more or less turbid fluid enters this collector, leaving it at $a'\ b'$, in order to be again filtered on its further passage along the channels $a\ b$ behind the chamber D through the frame 1, filter-plates, frame 2, and passages $c\ d$, finally entering the end chamber S completely filtered, where it may be run off through a discharge-cock. The collecting-chamber D, for the sake of securing better cleansing, is preferably constructed in two halves. It is provided on the top, like the chambers E S, with a gage and below with a draw-off cock, (which also serves as an air-outlet,) which permit of the filter-press being used only as a preliminary filter—that is, as far as the chamber D.

If desired, a chamber D may be introduced after each gridiron-frame 2; but it will in most cases be found convenient to arrange half the filter-press as a preliminary filter and the second half as a secondary filter.

I claim—

In a screw filter-press, the combination with an inlet-chamber E, gridiron-frames, filter-plates and end chamber S, of an intermediate or collecting chamber or chambers D, all as and for the purposes hereinbefore set forth.

In witness whereof I have hereunto set my hand in presence of two witnesses.

GUSTAV ACKERMANN.

Witnesses:
 HANS HEINMANN,
 C. H. DAY.